UNITED STATES PATENT OFFICE.

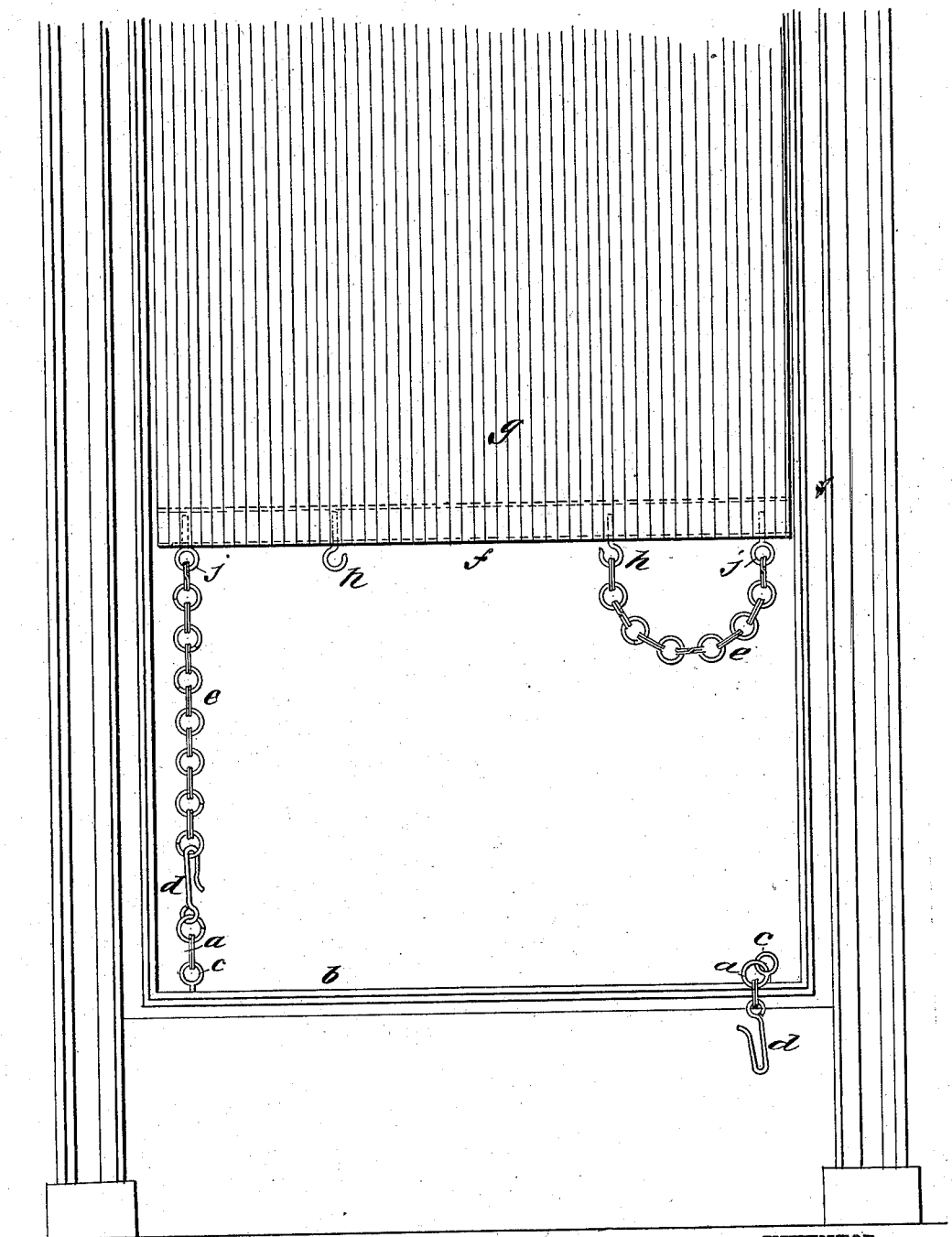

MARY J. C. THROOP, OF PORTLAND, MAINE.

CURTAIN-HOLDER.

SPECIFICATION forming part of Letters Patent No. 268,573, dated December 5, 1882.

Application filed September 19, 1882. (No model.)

*To all whom it may concern:*

Be it known that I, MARY J. C. THROOP, of Portland, in the county of Cumberland and State of Maine, have invented a new and Improved Curtain-Holder, of which the following is a full, clear, and exact description.

My invention consists of chains contrived to chain the lower end of a window-curtain down to the window-sill to prevent it from flapping by the wind when it is desirable to have the window open for the circulation of air and the curtain down to exclude the sun, all as hereinafter fully described.

Reference is to be had to the accompanying drawing, forming a part of this specification, which represents a front elevation of a window with my improved curtain attachments applied.

$a$ represents short sections of chain attached to the sill $b$, or any other part below the sill, by screw-eyes $c$, and having a hook, $d$, in the end not attached to the sill.

$e$ represents other and longer sections of chain, attached by screw-eyes $j$ to the rod or bar $f$, attached to the lower end of the window-curtain $g$.

$h$ represents hooks attached to rod or bar $f$ between the chains.

It will be seen that the curtain may be chained to the sill at any height above the hooks $d$ to prevent it from flapping by the wind when the window is raised for allowing the air to circulate.

When it is not desired to chain the curtain down the chains $e$ may be hitched up on the hooks $h$, by which they will form loops affording convenient hold, to be used instead of a tassel for pulling the curtain down.

Ornamental chains will add beauty to the curtain beside their usefulness to hold the curtain.

The hooks should be rather long and close-springing upon the ring end; or the hook may be a snap-hook to prevent unhooking in case the chains are slack.

The attachment is applicable to curtains arranged to be raised and lowered by any means, and it may be made more ornamental by having a double chain, one chain being a little longer than the other, which may remain looped; but this would considerably increase the expense.

Having thus fully described my invention, I claim as new and desire to secure by Letters Patent—

1. The combination, with a window-curtain, of chains attached to its lower end and hooks attached to the sill, substantially in the manner described, for securing the curtains against the wind, as set forth.

2. The combination of hooks $h$ with a window-curtain having chains $e$, substantially as described.

MARY J. C. THROOP.

Witnesses:
PHILIP J. LARABEE,
C. W. MORRILL.